(12) United States Patent  
Weisbach

(10) Patent No.: US 8,823,800 B2  
(45) Date of Patent: Sep. 2, 2014

(54) METHOD AND APPARATUS FOR THE CORRECTION OF A NON-UNIFORM SENSITIVITY OF DETECTOR ELEMENTS IN THERMOGRAPHIC CAMERAS

(75) Inventor: Frank Weisbach, Jena (DE)

(73) Assignee: ESW GmbH, Wedel (DE)

( * ) Notice: Subject to any disclaimer, the term of this patent is extended or adjusted under 35 U.S.C. 154(b) by 585 days.

(21) Appl. No.: 13/154,907

(22) Filed: Jun. 7, 2011

(65) Prior Publication Data

US 2011/0298931 A1   Dec. 8, 2011

(30) Foreign Application Priority Data

Jun. 7, 2010   (DE) .................. 10 2010 023 168

(51) Int. Cl.  
*H04N 5/30* (2006.01)  
*H04N 5/335* (2011.01)  
*H04N 5/365* (2011.01)  
*H04N 5/33* (2006.01)

(52) U.S. Cl.  
CPC ............... *H04N 5/3651* (2013.01); *H04N 5/33* (2013.01)  
USPC ......................................................... 348/162

(58) Field of Classification Search  
CPC ..... H04N 5/33; H04N 5/3651; H04N 5/3656; H04N 5/3655  
USPC .................................................. 348/162, 164  
See application file for complete search history.

(56) References Cited

U.S. PATENT DOCUMENTS 4,298,887 A   11/1981   Rode  
5,118,943 A   6/1992    Le Bars et al.

(Continued)

FOREIGN PATENT DOCUMENTS

DE   19715983 C1   9/1998  
GB   2336051 A    6/1999  
JP   2002310804 A  10/2002  
WO   9728639      8/1997

OTHER PUBLICATIONS

Harris et al., "Nonuniformity Correction of Infrared Image Sequences Using the Constant-Statistics Constraint", IEEE Transactions on Image Processing, Aug. 1999, vol. 8, No. 8.

(Continued)

*Primary Examiner* — Andy Rao  
*Assistant Examiner* — Jared Walker  
(74) *Attorney, Agent, or Firm* — Patentbar International, P.C.

(57) ABSTRACT

Method and apparatus for the correction of a non-uniform sensitivity of detector elements in thermographic cameras in which background frames of an internal reference are recorded in shutter phases when the beam path of the thermographic camera is closed, the variations between the background frames of the shutter phases are logged, and an updated background frame is generated and used for the correction of at least one image frame, characterized in that the updated background frame is generated from at least one newly recorded background frame and a background frame to be updated in that the data of every pixel of the newly recorded background frame are multiplied by a first factor and are added to the data of every pixel of the background frame to be updated which are multiplied by a second factor, wherein the first factor is a value between zero and one, and the second factor is the difference between one and the first factor, so that the data of every pixel of the updated background frame are in the form of an accumulated weighted average.

14 Claims, 3 Drawing Sheets

(56) References Cited

U.S. PATENT DOCUMENTS

| | | |
|---|---|---|
| 7,484,885 B1 | 2/2009 | Carlson et al. |
| 2008/0062123 A1* | 3/2008 | Bell ............................ 345/156 |
| 2008/0210872 A1* | 9/2008 | Grimberg ................. 250/339.04 |
| 2008/0302956 A1* | 12/2008 | Anderson ................. 250/252.1 |
| 2009/0273675 A1* | 11/2009 | Jonsson ....................... 348/164 |

OTHER PUBLICATIONS

Jain et al., "A Comparative Evaluation of Image Background Subtraction Techniques", Advanced Signal Processing Algorithms, Architectures, and Implementations XVII, vol. 6697, 66970E, 2007.

* cited by examiner

METHOD AND APPARATUS FOR THE CORRECTION OF A NON-UNIFORM SENSITIVITY OF DETECTOR ELEMENTS IN THERMOGRAPHIC CAMERAS

RELATED APPLICATIONS

This application claims priority to German Patent Application No. DE 10 2010 023 168.1, filed Jun. 7, 2010, which is incorporated herein by reference in its entirety.

FIELD OF THE INVENTION

The invention is directed to a method for the correction of a non-uniform sensitivity of detector elements in thermographic cameras. The invention is further directed to a thermographic camera by means of which thermal images which are corrected with respect to a non-uniform sensitivity of detector elements in thermographic cameras can be provided.

BACKGROUND OF THE INVENTION

By thermal image is meant an image generated by optical mapping of infrared radiation or thermal radiation. In terms of technology, a thermal image can be produced, particularly in the near infrared region by the known, conventional technologies for visible light such as by the use of CCD sensors or CMOS sensors. However, a thermal image can be generated particularly in the mid infrared and far infrared regions (definition of radiation bands according to DIN 5031, Part 7, 1984-01) by a matrix of temperature-sensitive resistors (detector elements) such as, e.g., a matrix arrangement of microbolometers. An arrangement of detector elements in a matrix (array) will be referred to hereinafter as "focal plane array" (FPA).

The recording of images is carried out in frames. By "frame" is meant that data set comprising the intensity values of the individual detector elements associated with an image at a readout time. The intensity values of the individual detector elements which are defined with respect to their level and spatial arrangement are referred to as pixels in the frames. In the following, recordings which actually represent a mapping of the environment are referred to as image frames, while recordings through which only internal reference data are acquired are referred to as background frames. Internal reference data can be acquired particularly through background frames by which a reference object is recorded.

The image frames and background frames can be modified, particularly corrected, stored and visually displayed, after readout. The (corrected) image frames and background frames are the basis for the outputted visually observable thermal images and background images.

A bias is usually applied to the individual detector elements of the FPAs which then permit a temperature-dependent current intensity. When the FPA is exposed via infrared optics, a thermal image can be realized.

However, the individual detector elements, particularly microbolometer resistors, have a non-uniform sensitivity, or non-uniformity, which results from the self-heating of each individual microbolometer which is due to biasing on the one hand and is based on manufacturing tolerances on the other hand. Owing to the non-uniform sensitivity, the data of the intensities of the pixels of every image frame contain contributions which can be considered as noise and constitute a source of error in the production of a thermal image or background image.

"Non-uniformity correction" (NUC) refers to methods by which a non-uniform sensitivity of the individual detector elements is compensated. The differences in the sensitivity of the detector elements can be greater than the intensity variations in the source image itself and must therefore always be corrected in practice in order to obtain a thermal image which reproduces a real temperature distribution. The distribution and level of the noise contributions to the individual intensities of the pixels can be derived from the background frames.

In this connection, NUC takes essentially two approaches: 1) reference-based methods using image frames which are calibrated when the camera is first put to use; and 2) scene-based methods in which the image frames are corrected continuously, or at least repeatedly, during the operation of the thermographic camera.

In known solutions, the FPA was thermostated. In more recent solutions, the substrate temperature is determined either directly by a substrate temperature sensor and/or indirectly by means of a thermally short-circuited microbolometer whose signal serves as a reference for the substrate temperature. As a rule, the two methods are used in parallel.

Regardless of whether it is based on direct or indirect measurement of the substrate temperature, the acquired substrate temperature signal can then be used to regulate the bias of the detector elements or to serve as an input variable for numerical correction based on stored calibration data.

A method for the correction of non-uniform sensitivities of detector elements is described in U.S. Pat. No. 4,298,887. The correction data are derived exclusively from the object image by means of a recursive filter and an arithmetic unit. A shutter for generating reference images by which the beam path of a thermographic camera can be occasionally closed is not provided.

In practice, shutterless methods have not yet gained acceptance. This is because the method does not deliver the desired quality of thermal images because the absolute measuring accuracy achieved is too low owing to the absence of internal reference (shutter). Also, the object scene must change regularly, which is why shutterless methods cannot be applied to fixed-installation cameras.

Conventionally, a shutter unit arranged in the beam path of the thermographic camera is closed at regular intervals interrupting the imaging beam path alternately with the recording of an image frame. The closed shutter unit is a defined object for infrared irradiation of the FPA because, in the infrared region, the shutter unit is also a radiation emitter which is parameterized by its temperature. However, the radiation physics characteristics of the shutter unit are well known. When the shutter unit is closed, the FPA delivers background frames which can be used for correcting the image frames.

A known method for correcting image frames is two-point correction. In this method, at least two frames of the same image are recorded consecutively and a—usually nonlinear—characteristic curve is generated by comparing the data of the individual pixels. This characteristic curve is approximated by a straight line which intersects the characteristic curve at least two points (two-point correction). A general linear equation can be given for an approximation of this kind:

$$f(y)=ax+b, \qquad (1)$$

where a is the gain, b is the intersection with the ordinate at x0 (offset), and f(y) is the approximated value of the data of the FPA (e.g., Harris et al., 1999, IEEE Transactions on Image Processing 8 (8: 1148-1151).

There are no stipulations, per se, as to the criteria under which the nonlinear characteristic line is approximated by the straight line, i.e., the mathematical methods on which the approximation is based. In practice, it is also very possible that the nonlinear characteristic curve is not known at all and that gain and offset are also determined without knowing it, e.g., based on a calibration. Nonlinear approximations are also known from the prior art, e.g., US 2009/0273675 A1.

US 2009/0273675 A1 discloses a method for the correction of non-uniform sensitivities of detector elements in thermographic cameras in which the beam path of a thermographic camera is interrupted periodically by a shutter unit over a shutter phase. During a first shutter phase, the output signal of each detector element is acquired by a FPA and is fed to a processor unit. Using these data, at least a first map of temperature distributions over the FPA is updated in the processor unit and a second map is made and stored in the processor unit. The data of the at least first map and the data of the second map come from different shutter phases and are approximated by the processor unit by means of a mathematical function (linear, polynomial). This function is then used to interpolate between the at least first map and the second map to compensate for variations in the data of the individual detector elements and to make a new map of the temperature distributions. Variations for each detector element can be compensated individually or for all of the detector elements with the aid of the new map.

By means of the solution according to US 2009/0273675 A1 it is possible to calibrate thermographic cameras individually, repeatedly, and also while they are in operation.

A drawback of the known prior art is that individual image frames whose data have excessive increases (peaks) in positive or negative direction exert a disproportionately great and long-lasting influence on the function used for the correction. Accordingly, data peaks whose occurrence is merely stochastic can have a long-term negative impact on the method.

Also, in practice, the existing solutions have the substantial drawback that they interrupt the recording of image frames often and for long periods of time. This greatly impairs a real-time display of thermal images. In addition, short-term fluctuations of the intensity values and noise are poorly smoothed because the thermal image recording and background recording alternate more or less evenly with one another. Possible long-term drift, i.e., changes in the display or readout data of measuring equipment which are not dependent on external influences, is not satisfactorily corrected. In order to improve both the smoothing of short-term fluctuations in intensity values and noise and the correction of long-term drift, which would naturally be desirable, many image frames and background frames would have to be stored and computed. This wastes considerable storage space and computing time. Further, the real-time image is repeatedly interrupted for long periods. This represents a substantial drawback for time-critical real-time applications.

SUMMARY OF THE INVENTION

It is the object of the present invention to propose a method whereby a correction of non-uniform sensitivity of detector elements in thermographic cameras is made possible with reduced computational effort and, at the same time, with a sharp reduction in the influence of individual data deviations. A further object of the invention is to propose a thermographic camera for implementation of the method according to the invention.

In a method for correcting a non-uniform sensitivity of detector elements in thermographic cameras in which background frames of an internal reference are recorded in shutter phases when the beam path of the thermographic camera is closed, the variations between the background frames of the shutter phases are logged, and an updated background frame is generated and used for the correction of at least one image frame, the above-stated object is met in that the updated background frame is generated from at least one newly recorded background frame and a background frame to be updated in that the data of every pixel of the newly recorded background frame are multiplied by a first factor and are added to the data of every pixel of the background frame to be updated which are multiplied by a second factor, wherein the first factor is a value between zero and one, and the second factor is the difference between one and the first factor, so that the data of every pixel of the updated background frame are in the form of an accumulated weighted average.

A correction of at least one image frame can be carried out pixel by pixel or uniformly for all pixels.

With each readout of a new background frame, new data are made available for updating the existing updated background frame; for this reason, the existing updated background frame becomes a background frame to be updated.

It should be noted in this connection that the background frames which are used for generating an updated background frame can come either from one individual shutter phase or from a plurality of shutter phases. In this connection, it is also not necessary to use all of the background frames of a respective shutter phase; rather, individual background frames can be selected. It may be useful, for example, to select a first background frame and a final background frame of a shutter phase or to always select one or more background frames from the middle of a shutter phase or to make the selection on the basis of other criteria.

A basic idea of the invention is that the data of all of the background frames that have already been used are retained (accumulated) in the updated background frame or in the background frame to be updated and contribute proportionally to the correction of at least one image frame. The respective updated background frame is generated by iteration from the preceding background frames, the newly recorded background frames, and the used background frames.

The calculation and use of an accumulated weighted average has the great advantage that the extent to which the data of a newly recorded background frame affect the updated background frame and, therefore, the long-term effect on the correction of at least one image frame can be determined by a suitable choice of the first factor and second factor. First and second factors can be selected for every background frame and for every pixel of every background frame.

The first factor and second factor are used for purposes of a weighting by percentage, and therefore a standardized weighting, wherein a weighting of 100% corresponds to a factor of one. Therefore, it likewise lies within the scope of the invention when a numerical value other than one is correspondingly selected as a weighting of 100%.

When the first factor is selected to be greater than the second factor, the background frame to be updated enters the updated background frame with a higher weighting than the newly recorded background frame. The choice of first factor can be made depending on different operating conditions of the thermographic camera and depending on the quality to be achieved in the correction of the at least one image frame. In a very advantageous embodiment of the method according to the invention, the first factor is adapted during operation of the thermographic camera. In so doing, it is advantageous when the contributions of newly recorded background frames to the updated background frames are higher during operating phases in which the operating conditions of the thermographic camera change drastically than during operating phases in which there are only slight changes in the operating conditions.

Therefore, it is possible that a first factor of one (100%) is selected so that an updating of the background frame to be updated is carried out in such a way that the existing updated background frame is entirely supplanted by a newly recorded background frame. In so doing, the existing noise in the newly recorded background frame caused by the non-uniform sensitivity of the detector elements is retained.

Further, it is possible to select a first factor of 0.5 (50%) so that the newly recorded background frame has the same contribution to the generation of the updated background frame as the background frame to be updated. A slight reduction in noise is brought about by selecting the first factor in this way.

In order to further reduce noise, it is possible to select a first factor of between 0.25 (25%) and less than 0.5 (50%) so that the newly recorded background frame contributes less to the generation of the updated background frame than the background frame to be updated.

A sharp reduction in noise is achieved when the first factor is selected between 0.1 (10%) and less than 0.25 (25%).

In this way, the influence of stochastically occurring variations and peaks in the data on the updated background frame is deliberately reduced in an extremely advantageous manner.

The influence of a newly recorded background frame on the updated background frame can be controlled through the choice of the first factor and the concomitant determination of the second factor.

The parameters of the method according to the invention such as the selection of the first factor, the quantity of background frames and the duration of the shutter phase and image phase are preferably adapted to the dynamic ranges of the detector elements.

It is possible for the updated background frame to be generated from background frames which are all recorded in the same shutter phase. It is further possible that the updated background frame used for the correction of at least one image frame is generated from background frames which are recorded during at least two shutter phases. There can be one or more image phases and one or more shutter phases between the respective shutter phases.

The first background frame to be updated is preferably a good-quality data set (frame) without peaks. For example, it can be an individual background frame or a background frame with averages from a quantity of background frames.

The at least one image frame to be corrected is preferably recorded following immediately in time upon at least one shutter phase in which the used background frames are recorded. The image frame can immediately follow the shutter phase or can immediately precede it.

However, it is also possible that the at least one image frame to be corrected is not recorded immediately following the shutter phase in which the background frames used for the correction of the at least one image frame are recorded.

The frames can be stored in storages, processed therein, and then made available again from the latter. However, it is also possible to do away with storages entirely or partially and to compute the frames in a continuous data stream. This has the advantage that temporary storage, which is time-critical and expensive at the targeted high data rates, can be dispensed with.

The detector unit is read out at a frequency in a range from 25 to 120 Hz, preferably in a range of 50 Hz.

The duration of a shutter phase is preferably between 0.05 and 5 seconds, a duration of 0.1 to 0.2 seconds being particularly favorable. On the other hand, the duration of an image phase is between 10 seconds and 5 minutes.

In this way, in an extremely advantageous manner the generation of real-time images is achieved with only infrequent and brief interruptions, which leads to a substantial improvement in imaging quality and to an expansion of possible uses of the method according to the invention.

By means of the method according to the invention, it is possible to allow a desired quantity of image frames follow a desired quantity of background frames. In an advantageous embodiment, 1000 image frames follow two background frames in the steady state of the detector unit. On the other hand, 250 to 1000 image frames advantageously follow 2 to 25 background frames during an initialization and warm-up phase.

It is also possible to vary the duration of image phases and the duration of the shutter phases and to adapt them to the relevant requirements with respect to the quality of the output images.

The described method according to the invention for the correction of non-uniform sensitivity of detector elements in thermographic cameras serves to compensate for spatial-temporal, usually stochastically occurring, variations in sensitivity over the detector unit.

Further, it is extremely advantageous to also determine the systematically changing contributions to the non-uniform sensitivity of detector elements and incorporate them in the correction of the image frame. Long-term drift can be taken into account as another input variable of this kind. The long-term drift is determined from the time-dependent variation of the data of the individual detector elements and is described by a function equation.

Long-term drift can be determined, for example, from the variation of the data of the individual pixels of at least two background frames. The long-term drift can be approximated and described by a function equation which can be freely selected, but which is preferably linear. The method of two-point correction can advantageously be used for approximating the long-term drift. The data set for a two-point correction of an image frame typically comprises an array of gain values and an array of offset values which are associated with the pixels. These gain values and offset values can be generated in the course of a factory calibration by means of external reference sources and then stored in the storage of the camera, or they can be generated during operation of the thermographic camera. Typically, the gain values are factory calibrated and the offset values are determined during the operation of the thermographic camera, e.g., by means of a shutter in the beam path of the thermographic camera.

A preferred embodiment of the method according to the invention for the correction of a non-uniform sensitivity of detector elements in thermographic cameras in which background frames of an internal reference are recorded in shutter phases when the beam path of the thermographic camera is closed, the variations between the background frames of the shutter phases are described by means of a function, and an updated background frame is generated based on the function and is used to correct at least one image frame is characterized in that a long-term drift of the data of at least two background frames which were recorded during at least one shutter phase is determined from the variation in the data of the individual detector elements, and in that the long-term drift is approximated and is described by a function equation, and a counting index indicating the sequence of image frames since the end of the last shutter phase is associated with each image frame to be corrected, and a correction value is assigned to every image frame based on its counting index by means of the function equation.

The correction value depends on the duration of the image phase and the quantity of image frames to be corrected.

When image frames are recorded continuously over the duration of an image phase and the function equation is linear, the long-term drift occurring over the duration of the image phase can be allocated to the image frames completely and uniformly in the form of correction values. When the recording of the image frames is carried out in a discontinuous manner or the selected function equation is nonlinear, the applicable correction value for an image frame is determined from the part of the function equation which coincides in time with the recording of the respective image frame.

The long-term drift can also be determined from background frames of a plurality of shutter phases and can then also be considered valid (interpolated) for the image recording phases in between. However, it can also be determined from background frames of one individual shutter phase and extrapolated to an image phase. Further, it is also possible to combine these procedures.

A long-term drift can also be determined over a plurality of images phases and shutter phases. For example, the long-term drift can be determined in such a way that an (arithmetic or other suitably selected) average of the data of the pixels of consecutive background frames is determined and monitored.

It is also possible to vary the duration of image phases and the duration of the shutter phases so as to be adapted to the determined long-term drift. For example, the image phases can be shortened for a larger long-term drift compared to a smaller long-term drift.

A correction of non-uniform sensitivities can be applied to individual image frames. It is also possible to compute, e.g., take an average of, a plurality of image frames before correcting them. Noise can be reduced even further in this way.

The method according to the invention is also applicable when the shutter phases are the same length as, or even longer than, the image phases. What is crucial is that at least two background frames are computed to form an updated background frame.

It is further noted that the display of thermal images and background images or the transfer thereof to an external computer is, of course, generally carried out in parallel with another image recording and this image recording is generally carried out in parallel with the computation of the previously recorded frames. The shutter unit is preferably controlled based on a clock for recording background frames and image frames, this clock having been determined as favorable beforehand, and this controlling of the shutter unit should usually not be influenced by the runtime of the processor unit or waiting times for the display and transmission of data.

By means of a thermographic camera with a shutter unit in the beam path of the thermographic camera for electively opening and closing the beam path, with a pixel-based detector unit comprising a quantity of detector elements for pixel-by-pixel detection of thermal radiation and with a processor unit for pixel-by-pixel processing, storage and provision of data of the detector units, wherein background frames can be recorded by the detector unit during a shutter phase when the shutter unit is closed and image frames can be recorded by the detector unit during an image phase when the shutter unit is open, the above-stated object of the invention is further met in that the processor unit is configured in such a way that an updated background frame is generated from at least one newly recorded background frame and a background frame to be updated in that the data of every pixel of the newly recorded background frame are multiplied by a first factor and are added to the data of every pixel of the background frame to be updated which are multiplied by a second factor, wherein the first factor is a value between zero and one and the second factor is the difference between one and the first factor so that the background frame to be updated becomes the updated background frame in which the data of every pixel are in the form of an accumulated weighted average.

By "pixel-based" is meant that an image frame is discretized by a determined quantity and arrangement of detector elements. The data of a pixel of a frame are generated by each detector element. The detector elements are usually arranged in a row-column matrix structure, but can also be arranged differently. What is important is that the arrangement remains the same when different frames are to be computed with one another such as, for example, the image frame and updated background frame during the correction of at least one image frame. "Pixel-by-pixel" means that the corresponding calculation is carried out for every pixel. Parameters such as sensitivity can then vary from detector element to detector element.

The processor unit can be connected to different storages for storing data and units for converting data.

The thermographic camera according to the invention can have an image display unit on which at least one thermal image or background image is displayed as an output image.

Further, the thermographic camera can have a computer interface by which the at least one output image can be transmitted to an external computer.

BRIEF DESCRIPTION OF THE DRAWINGS

The invention will be described more fully in the following with reference to embodiment examples and drawings. The drawings show.

DETAILED DESCRIPTION OF THE PREFERRED EMBODIMENTS

Figure 1:
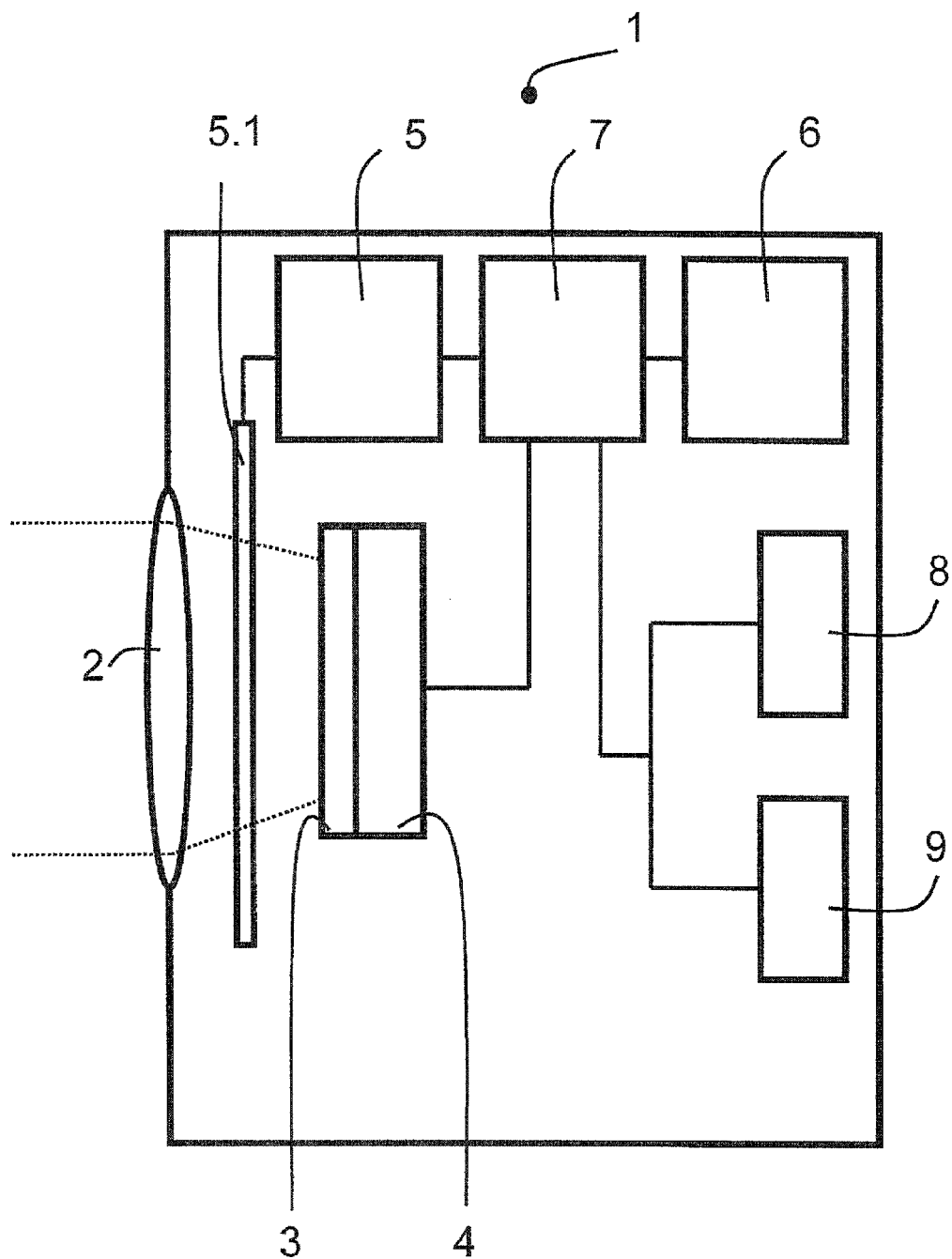
FIG. 1 a first embodiment example of a thermographic camera according to the invention.

FIG. 1 shows the essential elements of a thermographic camera 1 comprising IR optics 2, a shutter unit 5.1 arranged in the beam path (indicated by dotted lines) of the thermographic camera 1, a detector unit 3 which is likewise located in the beam path and is constructed as a microbolometer FPA, a readout unit 4 for reading out the detector unit 3, a processor unit 7 for pixel-by-pixel processing, storage and provision of data of the detector unit 3, a display 8 for showing a thermal image or background image as output image, and an interface 9 for connecting to external data-processing systems (not shown).

Further, a clock control 6 and a control 5 of the shutter unit 5.1 are connected to the processor unit 7 such that signals are passed. The times and duration of shutter phases over which the beam path is closed by the shutter unit 5.1 and background frames are recorded by the detector unit 3 are controlled by the clock control 6. To this end, control commands are passed from the clock control 6 to the control 5 by the processor unit 7. Further, times and duration of image phases over which the beam path is open and image frames are recorded by the detector unit 3 are controlled by the clock control 6.

Also connected to the processor unit 7 is the readout unit 4. The detector unit 3 and readout unit 4 are adapted to one another in such a way that frames are read out and sent to the processor unit 7 at a frequency of 50 Hz.

The duration of the shutter phases is 0.1 seconds, within which time two background frames are newly recorded. No background frames are recorded over the duration of an opening or closing movement of the shutter unit 5.1 before it is fully open or fully closed. The duration of the image phases is 20 seconds (1000 image frames).

The processor unit 7 is configured in such a way that a background frame to be updated, which is provided in the form of signal data of every pixel of a background frame to be updated, and at least one newly recorded background frame which is supplied to the processor unit 7 are changed by the processor unit 7 into an updated background frame by means of a rule, wherein the data of every pixel of the newly recorded background frame are multiplied by a first factor and are added to the data of every pixel of the background frame to be updated which are multiplied by a second factor so that the background frame to be updated becomes the updated background frame and the updated background frame generated in this way is provided for the correction of at least one image frame by the processor unit 7. The processor unit 7 is constructed as a recursive filter, but can be any suitable component or any suitable circuit in other embodiments of the invention.

Storages can be connected to or integrated in the processor unit 7 to store, process and provide image frames and/or background frames (not shown).

In other embodiments of the thermographic camera 1 according to the invention, storages of the type mentioned above can be dispensed with entirely or in part when the image frames and/or background frames are further computed directly as a data stream. Further, storages may be provided (not shown) in which values for gain and offset are stored. In this case, the values for gain and offset can be stored as individual values in the form of scalar values or as matrices when gain and offset are given individually for every pixel position.

The processor unit 7 can be constructed so as to have read-write access to one or more storages.

Figure 2:
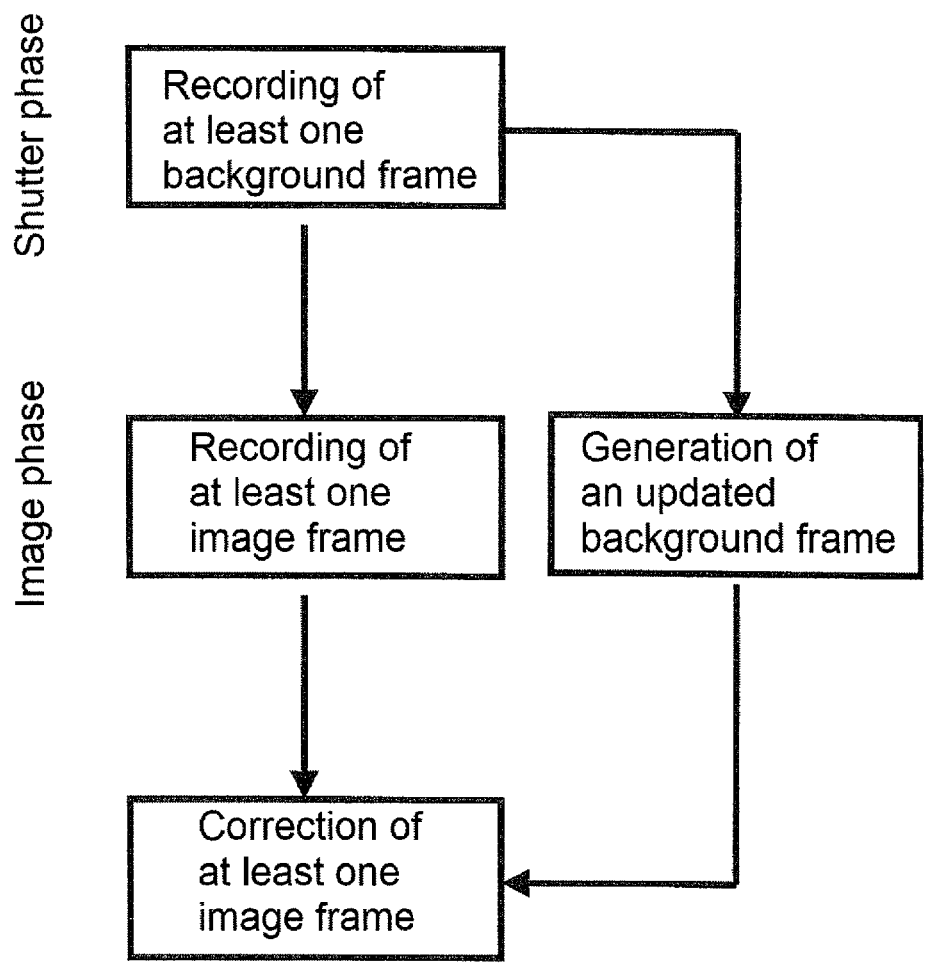
FIG. 2 a flowchart showing a first embodiment form of the method according to the invention.

The flow of the method according to the invention is shown in a highly schematic manner in FIG. 2. During a shutter phase, one or more background frames are recorded by the detector unit 3, read out of the detector unit 3 by the readout unit 4, and sent to the processor unit 7. With each newly recorded background frame to be used, an updated background frame becomes a background frame to be updated. The update is carried out in that the data of every pixel of the newly recorded background frame is multiplied by a first factor and added to the data of every pixel of the background frame to be updated which are multiplied by a second factor.

At the end of the shutter phase, at least one image frame is recorded over the duration of an image phase and is sent to the processor unit 7. The data of the pixels of the updated background frame are subtracted (correction) from the data of the pixels of the at least one image frame. An output image (thermal image) generated on the basis of the image frame that is corrected in this way is corrected for non-uniform sensitivities of the detector elements.

In further embodiments of the invention, the correction can also be carried out by any other suitable computation of the data of the pixels.

The data of every pixel of an updated background frame are generated according to the following rule:

$$I'_{i,j,n} = g * I_{i,j,n} + (1-g) * I'_{i,j,n-1}, \quad (2)$$

where $I'_{i,j,n}$ is a pixel in an updated background frame comprising i rows and j columns, n is a counting index of the background frames, g is the first factor, $I'_{i,j,n-1}$ is the intensity of a pixel of the ith row and jth column in a background frame to be updated, and $I_{i,j,n}$ is the intensity of a pixel of the ith row and the jth column in a newly recorded background frame that is used. The accumulated contributions of the newly recorded background frames to the updated background frame follow the function $y=1-\exp(-n*g*I'_{i,j,n})$. This approaches the value 1 asymptotically according to an exponential slope. Accordingly, with a first factor g of 0.3 and a second factor (1−g) of 0.7, 63% of the final value is achieved after 10 accumulated background frames and over 90% after 24 frames.

The first factor can be determined individually in other embodiments of the method, but also in every individual background frame and even for every individual pixel in every individual background frame.

The mathematical relationship shown above can be used with known or estimated values of g for determining a required minimum quantity of background frames to achieve a certain quality of the updated background frames. Further, the number of newly recorded background frames after which there is no relevant increase achieved in the quality of the updated background frames can be estimated. Based on this information, the duration of the shutter phases and image phases can be optimized.

By way of example, a first factor g equal to one (corresponding to 100%) is selected. In this case, there is an immediate updating of the background image, but no noise suppression takes place. Rather, the newly recorded background frame along with the noise contained therein takes the place of the updated background frame. A distinct (noise) pattern is still visible in an output image produced by the image frame corrected in this way. This choice of first factor is applied during the initialization of the thermographic camera 1 after switching on or after a reconfiguration of the detector unit 3 such as is carried out after changing the bias and when adapting to the dynamic ranges.

In another embodiment, a first factor g of 0.5 (corresponding to 50%) is selected. This choice causes a fast updating of the background frame because a newly recorded background frame contributes to generating the updated background frame with the same weighting as the background frame to be updated. In so doing, the noise of the background frames is suppressed slightly. A first factor g of 0.5 is selected, for example, immediately following the initialization of the system or reconfiguration of the detector when the signal drift is still very high.

When the first factor g is selected in a range of greater than 0.25 (25%) to less than 0.5 (50%), the contribution of the newly recorded background frame to the updated background frame is less than the contribution of the background frame to be updated.

A medium noise suppression is achieved so that the quality of the correction of the at least one image frame is improved compared to the choice of 0.5 or more for the first factor g. Implementation of the method with first factors g between 0.25 and 0.5 can be used when the operating conditions of the thermographic camera change such as can happen, for example, during a warm-up phase of the thermographic camera or due to external influences such as fluctuating ambient temperatures.

In another embodiment of the method according to the invention, a first factor g of 0.1 (10%) to less than 0.25 (25%) is selected. The respective contribution of the newly recorded background frame to the updated background frame is substantially smaller than the contribution of the background frame to be updated. Therefore, the updated background frame changes only gradually, the noise suppression is very high resulting in the best possible quality correction. The choice of a low first factor g is best carried out when the thermographic camera has reached a constant operating temperature.

Another input variable for the correction of the image frames is determined from an existing long-term drift L of the detector elements. For this purpose, the intensity values of the pixels are determined from the respective averaged background frames of two consecutive shutter phases.

In this connection, it is assumed that the long-term drift L in the image phase following two shutter phases continues linear so that a predictive drift correction of updated image frames is possible.

A counting index k indicating the sequence, i.e., the chronological order, of image frames since the end of the last shutter phase is assigned to each of the image frames recorded in the image phase. The image frames are recorded in identical time intervals and with the same duration of every recording. The correction value for the offset of a pixel is given by the long-term drift L determined for the duration of the image phase divided by the quantity k of image frames as L/k for the first image frame, 2L/k for the second image frame, . . . and by kL/k for the kth image frame. Accordingly, the long-term drift L is allocated completely and uniformly to the k image frames.

Figure 3:
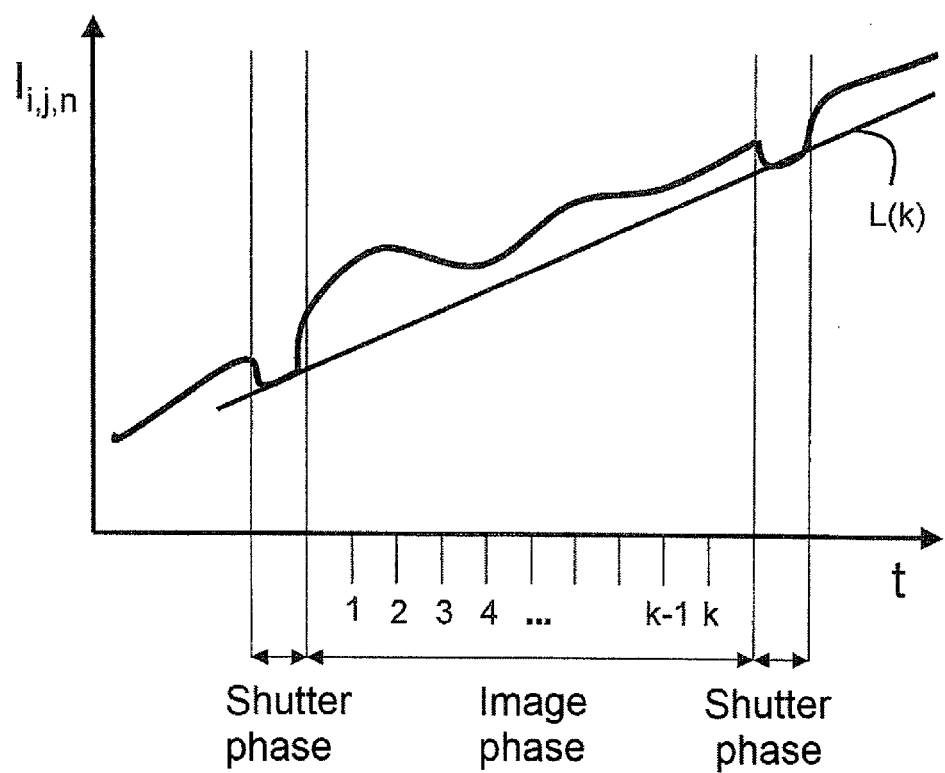
FIG. 3 a schematic representation of a curve of the intensities of a pixel with long-term drift over two shutter phases and one image phase.

As is shown by the diagram in FIG. 3, an increase in the intensity values $I_{i,j,n}$ of the pixels by means of the background frames recorded in two shutter phases is determined and approximated by a function. The long-term drift L is described by a constant and linearly increasing function L(k) in FIG. 3. Therefore, the measured intensity values $I_{i,j,n}$ of the pixels are shifted to higher values.

There are k image frames recorded over the duration of the image phase (division of the abscissa). The associated value of the function L(k) is assigned as correction value to every measured intensity value $I_{i,j,n}$ of a pixel in a kth image frame based on the function equation. The respective correction value is subtracted from the intensity value $I_{i,j,n}$ of the pixel to which it was assigned so that intensity values $I_{i,j,n}$ of the pixels which are corrected with respect to long-term drift L are obtained.

In another embodiment form, the correction of the long-term drift can also be carried out globally instead of pixel by pixel. In this case, the intensity values of all of the pixels from the background frames of two consecutive shutter phases are averaged. A global correction value which acts in the same way on all of the pixels of the frame is calculated from the averaged intensity values in every image frame.

In further embodiments of the method according to the invention, the allocation of the long-term drift L to the image frames can also be carried out incompletely and/or unevenly and already before computing with the updated background frame.

In other embodiment forms, the long-term drift L can also be determined from the background frames of the same shutter phases.

The person skilled in the art will understand that the scope of the present invention is not limited by the specific details indicated in the description but, rather, solely by the claims. Many variations and alternatives are possible within the protective scope indicated by the claims. In particular, different numerical values than those indicated herein and different iterative methods can be selected without departing from the spirit and scope of the invention.

REFERENCE NUMERALS 1 thermographic camera
2 IR optics
3 detector unit
4 readout unit
5 control
5.1 shutter unit
6 clock control
7 processor unit
8 display
9 interface

What is claimed is:

1. A method for correcting non-uniform sensitivity of detector elements in a thermographic camera comprising:
   recording background frames for internal reference during shutter states corresponding to a beam path of the thermographic camera being closed, wherein a background frame comprises a data set of intensity values of individual detector elements associated with an image of said internal reference at a readout time,
   logging variations between the background frames for the shutter states,
   generating an updated background frame, using background frames recorded during at least two shutter states, from a newly recorded background frame and a background frame to be updated by adding a value of each pixel of the newly recorded background frame multiplied by a first factor and a value of each pixel of the background frame to be updated multiplied by a second factor, wherein the first factor is a value between zero and one, and the second factor is the difference between one and the first factor, so that a value of each pixel of the updated background frame is an accumulated weighted average, and
   correcting at least one image frame using the updated background frame.

2. The method of claim 1, wherein the updated background frame is generated from background frames recorded in the same shutter state.

3. The method of claim 1, wherein the at least one image frame being corrected is recorded immediately after a shutter state during which the background frames used for the correcting of the at least one image frame were recorded.

4. The method of claim 1, wherein a selected duration of a shutter state is between 0.05 and 0.2 seconds.

5. The method of claim 4, wherein the duration of an imaging state is between 10 seconds and 5 minutes.

6. The method of claim 5, wherein the first factor is one, so that the generating of the updated background frame results in the updated background frame being identical to the newly recorded background frame.

7. The method of claim 5, wherein the first factor is 0.5, so that a contribution of the newly recorded background frame to the updated background frame is equal to a contribution of the background frame to be updated.

8. The method of claim 5, wherein the first factor is at least 0.25 and less than 0.5, so that a contribution of the newly recorded background frame to the updated background frame is less than a contribution of the background frame to be updated.

9. The method of claim 5, wherein the first factor is at least 0.1 and less than 0.25, so that a contribution of the newly recorded background frame to the updated background frame is less than a contribution of the background frame to be updated.

10. The method of claim 1, further comprising using a long-term drift function determined from time-dependent variation of values of individual pixels as an additional input variable for the correcting of the non-uniform sensitivity of the detector elements in the thermographic camera.

11. A method for correcting non-uniform sensitivity of detector elements in a thermographic camera comprising:
   recording background frames of an internal reference which are provided by a reference object during shutter states corresponding to a beam path of the thermographic camera being closed, wherein a background frame comprises a data set of intensity values of individual detector elements associated with an image of said internal reference at a readout time,
   determining a function describing variations between the background frames for the shutter phases, and
   generating an updated background frame based on the function approximating and describing a long-term drift of the values of at least two background frames recorded during at least one shutter state, the long-term drift being determined from variation in values of individual detector pixels,
   assigning each image frame to be corrected a counting index within a sequence of image frames following an end of a prior shutter phase,
   using the function to assign a correction value to every image frame based on its counting index, and
   correcting at least one image frame using the updated background frame.

12. A thermographic camera comprising: a shutter unit in a beam path of the thermographic camera for electively opening and closing the beam path, a pixel-based detector unit comprising detector elements for pixel-by-pixel detection of thermal radiation, and a processor unit for pixel-by-pixel processing, storage and providing data from the detector unit, wherein the detector unit is capable of recording background frames and each background frame comprises a data set of intensity values of individual detector elements associated with an image recorded during a shutter state when the shutter unit is closed, wherein the detector unit is capable of recording image frames during a shutter state when the shutter unit is open, wherein the processor unit is capable of generating an updated background frame from a newly recorded background frame and a background frame to be updated by adding a value of each pixel of the newly recorded background frame multiplied by a first factor and a value of each pixel of the background frame to be updated multiplied by a second factor, wherein the first factor is a value between zero and one, and the second factor is the difference between one and the first factor, so that a value of each pixel of the updated background frame is an accumulated weighted average, and wherein the processor unit is capable of generating at least one output image by applying said updated background frame to at least one image frame of the detector unit.

13. The camera of claim 12, further comprising a display displaying at least one output image.

14. The camera of claim 12, further comprising a computer interface capable of transmitting the at least one output image to an external data processing system.

* * * * *